US010003498B2

(12) United States Patent
Shevenell et al.

(10) Patent No.: US 10,003,498 B2
(45) Date of Patent: Jun. 19, 2018

(54) EFFICIENT MANAGEMENT OF NETWORK CONFIGURATION-DEPENDENT NETWORK FUNCTIONALITY

(71) Applicant: CA, Inc., New York, NY (US)

(72) Inventors: Michael Paul Shevenell, Dover, NH (US); Timothy Diep, Portsmouth, NH (US)

(73) Assignee: CA, Inc., New York, NY (US)

( * ) Notice: Subject to any disclaimer, the term of this patent is extended or adjusted under 35 U.S.C. 154(b) by 212 days.

(21) Appl. No.: 14/754,183

(22) Filed: Jun. 29, 2015

(65) Prior Publication Data
US 2016/0380807 A1 Dec. 29, 2016

(51) Int. Cl.
*H04L 12/24* (2006.01)
(52) U.S. Cl.
CPC ........ *H04L 41/082* (2013.01); *H04L 41/0816* (2013.01); *H04L 41/12* (2013.01); *H04L 41/5006* (2013.01); *H04L 41/5038* (2013.01)
(58) Field of Classification Search
None
See application file for complete search history.

(56) References Cited

U.S. PATENT DOCUMENTS

| 6,400,707 | B1 * | 6/2002 | Baum | H04L 63/0263 370/352 |
| 6,442,616 | B1 * | 8/2002 | Inoue | H04L 29/12311 455/432.1 |
| 9,430,262 | B1 * | 8/2016 | Felstaine | G06F 9/45558 |
| 9,462,504 | B2 | 10/2016 | Stephens et al. | |
| 9,614,978 | B2 | 4/2017 | Hu et al. | |
| 2003/0120935 | A1 * | 6/2003 | Teal | G06F 21/57 713/188 |
| 2004/0136386 | A1 | 7/2004 | Miller et al. | |
| 2004/0186906 | A1 * | 9/2004 | Torrant | H04L 41/046 709/225 |

(Continued)

FOREIGN PATENT DOCUMENTS

WO    WO 2015031866 A1 *  3/2015  ............. H04L 41/14

OTHER PUBLICATIONS

Sharma, "Network Function Virtualisation-Service Quality Metrics", Oct. 31, 2014, 18 pages; Obtained from: http://www.slideshare.net/sidneel/network-function-virtualization-service-quality on May 18, 2015.

*Primary Examiner* — Ayaz R Sheikh
*Assistant Examiner* — Tarell Hampton
(74) *Attorney, Agent, or Firm* — Gilliam IP PLLC

(57) ABSTRACT

Notifications associated with software-defined network components are registered for. A notification is received in accordance with the registration. It is determined that the notification indicates a configuration change to a network associated with the software-defined network components. In response to a determination that the notification indicates the configuration change, a network topology associated with the network is determined. It is determined that one or more network functionalities are impacted by the configuration change based, at least in part, on the network topology. In response to a determination that the one or more network functionalities are impacted by the configuration change, the one or more network functionalities are updated based, at least in part, on the network topology.

20 Claims, 8 Drawing Sheets

(56) References Cited

U.S. PATENT DOCUMENTS

| | | | |
|---|---|---|---|
| 2004/0258044 A1* | 12/2004 | Girouard | H04L 51/12 370/352 |
| 2005/0138004 A1* | 6/2005 | Teplitsky | G06F 17/30887 |
| 2007/0226228 A1* | 9/2007 | Her | H04L 12/2602 |
| 2010/0080226 A1* | 4/2010 | Khalid | H04L 41/5003 370/392 |
| 2013/0124807 A1 | 5/2013 | Nielsen et al. | |
| 2013/0329601 A1 | 12/2013 | Yin et al. | |
| 2014/0177634 A1 | 6/2014 | Jiang et al. | |
| 2014/0280817 A1* | 9/2014 | Uppalapati | H04L 41/044 709/223 |
| 2014/0314087 A1 | 10/2014 | Kusano | |
| 2014/0317293 A1* | 10/2014 | Shatzkamer | G06F 9/455 709/226 |
| 2014/0362775 A1 | 12/2014 | Steiner et al. | |
| 2015/0131989 A1 | 5/2015 | Syed et al. | |
| 2015/0350102 A1* | 12/2015 | Leon-Garcia | H04L 41/12 709/226 |
| 2016/0127181 A1* | 5/2016 | Li | H04L 41/0806 370/254 |
| 2016/0149788 A1* | 5/2016 | Zhang | H04L 43/10 709/224 |
| 2016/0212012 A1* | 7/2016 | Young | H04L 41/14 |
| 2016/0294732 A1 | 10/2016 | Chou et al. | |
| 2016/0308759 A1 | 10/2016 | Feng et al. | |
| 2016/0337272 A1 | 11/2016 | Berman | |
| 2016/0373359 A1* | 12/2016 | Bruun | H04L 47/20 |
| 2017/0012975 A1* | 1/2017 | Ilyadis | H04L 63/08 |
| 2017/0026270 A1* | 1/2017 | Handige Shankar | H04L 41/22 |
| 2017/0104671 A1 | 4/2017 | Zhang et al. | |

\* cited by examiner

EFFICIENT MANAGEMENT OF NETWORK CONFIGURATION-DEPENDENT NETWORK FUNCTIONALITY

BACKGROUND

The disclosure generally relates to the field of computer networks, and more particularly to network functions virtualization.

Networking environments typically consist of physical hardware, such as routers and firewalls, interconnected with physical cabling. To change a network, upgrade hardware, etc., a network administrator typically interacts with the hardware directly. For example, to add networking capacity, a network administrator might purchase a new router, install the router in a data center, and physically connect the router with Ethernet cables to other networking components. To update network component configurations, the network administrator might connect to the particular network component over the network and interact directly with software on the network component.

More recently, software-defined networking (SDN) and the network functions virtualization has increased the flexibility afforded to network administrators. While SDN implementations can vary, SDN implementations typically facilitate programmatic interactions with networking hardware by providing, for example, application program interfaces (APIs). Thus, instead of connecting directly to a particular network component (e.g., via a telnet or secure shell), a network administrator can use a management interface to send messages to the network component via the API, which can be implemented using standard web service protocols. Further, the APIs facilitate the use of software to modify the network configuration without explicit user intervention. For example, a software process might monitor the status of various network components. If a network component becomes nonfunctional (e.g., loses power), the software process might dynamically change the network configuration to use a different network component in place of the nonfunctional network component.

Network functions virtualization replaces physical network components with software-based network components (referred to herein as "virtualized network functionality" and "software-defined network components"), similar to the replacement of physical servers by virtual machines. Thus, instead of purchasing and installing a new router when network capacity is exceeded, a "soft" router can be provisioned. Although ultimately backed by physical hardware, virtualized network functionality can be implemented on top of general purpose hardware instead of highly specialized, dedicated hardware. Thus, the same physical resources can be provisioned to perform different functions at different times.

SUMMARY

A notification-based service manager can register for notifications from an SDN controller. When the network configuration changes, the notification-based service manager receives notifications from the SDN controller. The notification-based service manager can then identify functionality impacted by the configuration change and update the functionality based on the configuration change.

A normalized SDN interface can act as an interface between the service manager and SDN managers. The normalized SDN interface can receive a message from the service manager that conforms to a normalized SDN protocol. The normalized SDN interface can then identify a destination for the message and an adapter configured to transform the message into a message that conforms to an SDN protocol implemented by the destination. Similarly, the normalized SDN interface can receive a message from an SDN manager or SDN device that conforms to an SDN protocol implemented by the SDN manager or SDN device. The normalized SDN interface can then identify an adapter configured to transform the message into a message that conforms to the normalized SDN protocol.

This summary is a brief summary for the disclosure, and not a comprehensive summary. The purpose of this brief summary is to provide a compact explanation as a preview to the disclosure. This brief summary does not capture the entire disclosure or all embodiments, and should not be used limit claim scope.

BRIEF DESCRIPTION OF THE DRAWINGS

Aspects of the disclosure may be better understood by referencing the accompanying drawings.

DESCRIPTION

Figure 1:
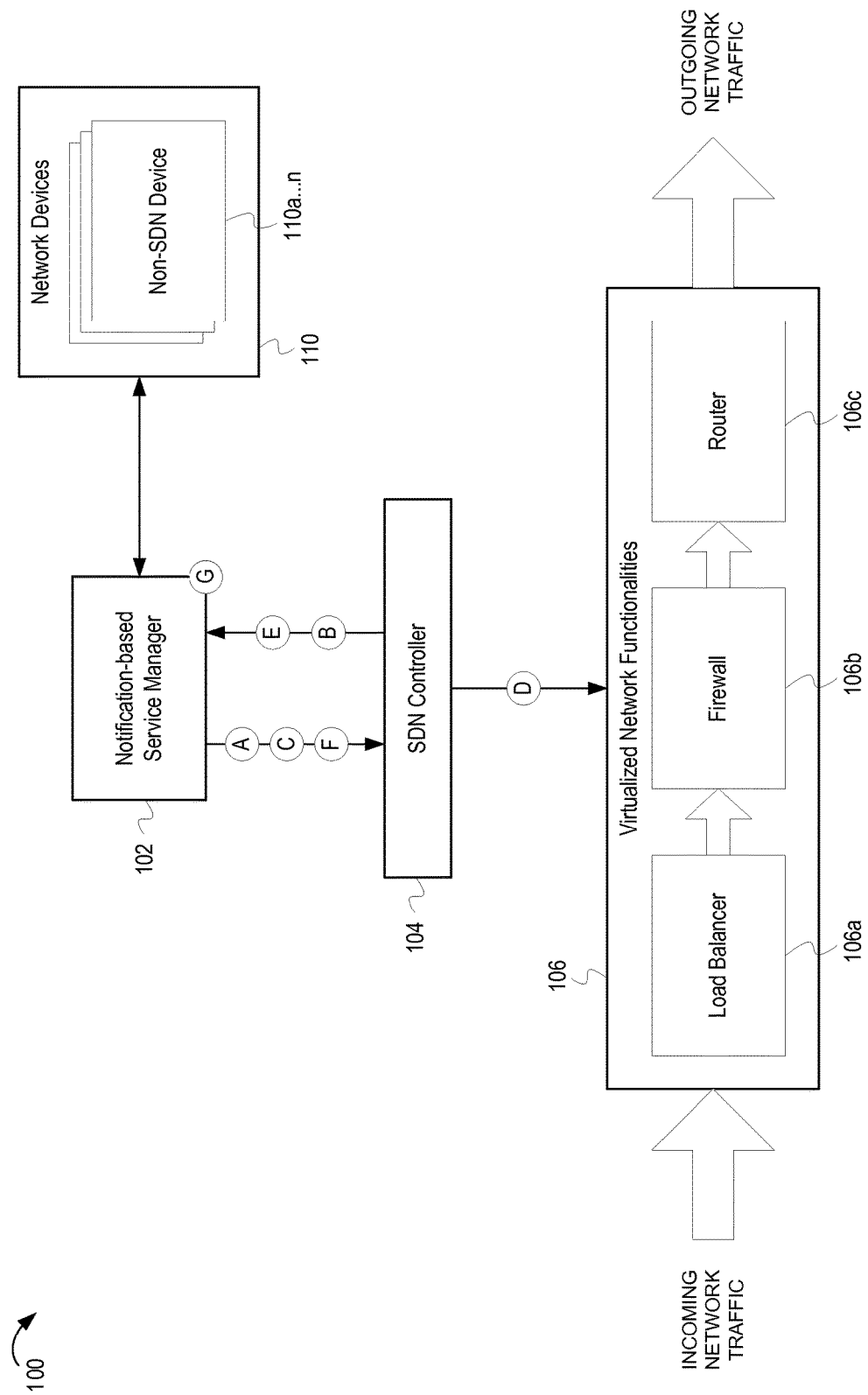
FIG. 1 depicts example operations of a network managed by a notification-based service manager.

The description that follows includes example systems, methods, techniques, and program flows that embody aspects of the disclosure. However, it is understood that this disclosure may be practiced without these specific details. In other instances, well-known instruction instances, protocols, structures and techniques have not been shown in detail in order not to obfuscate the description.

Configuration-dependent network functionality includes functionality that varies depending on the particular configuration of the network, such as network monitoring and testing. For example, if a particular network component is removed, functionality that monitors the performance of the network component should be updated to reflect the network component's removal.

In hardware-based networks, changes to the network configuration are generally planned or, to some degree, involve user interaction. Thus, changes to configuration-dependent network functionality, such as network monitoring and testing, can be factored into the changes. However, when a network configuration can change rapidly and/or without user interaction, configuration-dependent network functionality should typically be updated on similar timescales and without user interaction.

Consider, for example, a service manager that monitors the latency between two virtualized routers within a network. If the latency surpasses a particular threshold, the service manager might indicate that a network configuration change should be made to provide an alternate route between the routers in order to reduce the latency. However, another component might have already modified the network topology in such a way that the latency between the two routers is an irrelevant metric. For example, a new path through the network with lower latency might have been created and most traffic redirected along the new path. Thus, if the service manager is not aware of the network topology change, the service manager might still detect high latency between the two routers and dictate a change to the network configuration. However, because the new path is available, the change dictated by the service manager is unnecessary. To avoid potential network disruption, the service manager and other components that implement configuration-dependent network functionality should be updated (if appropriate) soon after a network configuration change.

Service managers can be implemented to poll various network components to determine when configuration changes occur. For example, a network monitoring system might use the Simple Network Management Protocol (SNMP) to retrieve the routing table from a router at periodic intervals. Polling network components for information can be inefficient. For example, the configuration of a particular network component might rarely change, making most poll messages and associated responses unnecessary. Further, as the amount of time between poll messages ("poll window") decreases, the inefficiency of polling the network components increases. Thus, as the frequency of network configuration changes increase, the inefficiency of using polling-based techniques to monitor for the network configuration changes increases as well.

To increase the responsiveness to configuration changes, a service manager can register to receive notifications from an SDN controller. The notifications can include network configuration changes, statistics, indications of problems, etc. When the service manager receives a notification of a network configuration change, the service manager can modify network configuration-dependent network functionality in accordance with the new network configuration. For example, the service manager can implement tests that measure the performance of various virtualized network functionalities used in the modified network configuration.

Notification-Based Service Manager Example Illustrations

FIG. 1 depicts example operations of a network managed by a notification-based service manager. FIG. 1 depicts a network 100, including a notification-based service manager (hereinafter "service manager") 102. An SDN controller 104 is communicatively coupled with the service manager 102 and a set of virtualized network functionalities 106. The set of virtualized network functionalities 106 include a load balancer 106a, a firewall 106b, and a router 106c. The service manager 102 is further communicatively coupled with a set of network devices 110, which include non-SDN devices 110a through 110n.

The set of virtualized network functionalities 106 are an example of a service chain. A service chain is a set of network functionalities, implemented as virtualized network functionalities or non-virtualized network functionalities (e.g., special purpose devices), through which network traffic passes. Consider the example illustrated by the set of virtualized network functionalities 106. Incoming network traffic (generally network packets) is received by one or more of the set of virtualized network functionalities 106, such as the load balancer 106a. The load balancer 106a directs the traffic to one of multiple possible paths (alternate paths not depicted) based on the destination of the network traffic and the load on the possible paths and/or endpoints associated with the network traffic. In this particular example, the load balancer 106a directs at least some portion of the traffic to the firewall 106b. The firewall 106b filters the network traffic in accordance with one or more security policies. If the network traffic is allowed to pass through the firewall 106b, the network traffic flows to the router 106c. The router 106c routes the network traffic along a particular path based on the destination of the network traffic.

Service chains can vary according to the purpose of the particular network and/or service chain. For example, if the network traffic comprised video data, a service chain might include a virtualized video optimizer. If the network traffic hosted webpage data, the service chain might include a virtualized cache. Similarly, service chains can vary according to other criteria as well. For example, the number of routers located along a service chain might vary based on the number of endpoint devices on the network.

When criteria or purpose of a network and/or service chain changes, the constituent functionality of the service chain can change as well. For example, if network traffic increases, an additional, alternate service chain might be provisioned. Or if the data that made up the network traffic began to include less video data, a virtualized video optimizer might be removed from the service chain. Thus, while the current example includes a load balancer 106a, a firewall 106b, and a router 106c, service chains and virtualized network functionalities can vary.

Stages A through G depict a set of example operations performed by the various components of the network 100 that include registration for notifications, receiving notifications of configuration changes, and updating configuration-dependent network functionality.

At stage A, the service manager 102 registers to receive notifications from the SDN controller 104. To register for the notifications, the service manager 102 sends a registration request to the SDN controller 104. The registration request identifies the service manager 102 as the notification receiver. The registration request can specify the particular notifications that the service manager 102 is registering for. For example, the registration request might indicate specific notifications (e.g., for a particular configuration change or statistic), classes of notifications (e.g., all configuration changes or all statistics-related notifications), or all notifications. Examples of mechanisms employed to identify the service manager 102 as the notification receiver include a media access control (MAC) address, Internet Protocol (IP) address, etc. In this particular example, the service manager 102 registers for notifications related to network problems (e.g., loss of connectivity, performance degradation, etc.) and network configuration changes.

At stage B, the SDN controller 104 detects a network problem and notifies the service manager 102. The particular mechanism by which the SDN controller 104 detects the network problem can vary. For example, the SDN controller 104 might periodically attempt to communicate with one of the virtualized network functionalities 106. If the SDN controller 104 does not receive a response to the communication or the response is delayed beyond a certain time period, the SDN controller 104 might determine that there is a network problem. As another example, the SDN controller 104 might receive a notification from another component that indicates the network problem. Thus, the SDN controller 104 might relay notifications to the service manager 102.

The specific information included in the notification sent from the SDN controller 104 to the service manager 102 can vary. For example, the notification might identify the SDN controller 104, the particular virtualized network functionalities impacted by the network problem, and the type of network problem. The notification might also include other information, such as the network topology, statistics related to the network problem, etc.

At stage C, in response to receiving the notification at stage B, the service manager 102 determines a course of action to be taken by the SDN controller 104 and notifies the SDN controller 104 of the particular course of action. For example, the service manager 102 might determine that an additional service chain should be provisioned or additional virtualized network functionality should be added to an existing service chain. As another example, the service manager 102 might determine that one or more configuration options (e.g., packet size, cache size, network traffic destination, etc.) should be changed.

At stage D, the SDN controller 104 modifies the network configuration in accordance with the course of action indicated by the service manager 102. As mentioned above, the particular action can vary. For example, the SDN controller 104 might identify a particular virtualized network functionality and indicate, via an API implemented by the particular virtualized network functionality, that a particular configuration option should be changed. As another example, the SDN controller 104 might identify a hypervisor and provision one or more additional virtualized network functionalities from the hypervisor or indicate that one or more virtualized network functionalities should be released (i.e., turned off).

At stage E, the SDN controller 104 notifies the service manager 102 of the configuration change. Although the service manager 102 might have indicated the specific configuration change to the SDN controller 104, the notification serves to indicate that the configuration change has been implemented. Similar to the notification sent to the service manager 102 above at stage B, the specific information included in the notification to the service manager 102 can vary. For example, the notification might indicate the specific configuration change that was implemented. In some instances, the notification might include an identifier that links the notification to the notification received from the service manager 102 at stage C.

At stage F, the service manager 102 determines the current network topology. In some instances, the service manager 102 can store the network topology and, based on the configuration change indicated to the SDN controller 104 at stage C, determine the current network topology. However, in some instances, the service manager 102 queries the SDN controller 104 and/or the virtualized network functionalities 106 to determine the current network topology. For example, while the service manager 102 might indicate a particular configuration change, the SDN controller 104 might change other aspects of the network topology to accommodate the particular configuration change. Additionally, the service manager 102 might not indicate a specific configuration change, instead indicating a specific goal. For example, the service manager 102 might indicate that the SDN controller 104 should increase the throughput of the service change without specifically indicating what configuration changes should be made to accomplish the goal. Thus, even though the SDN controller 104 modified the network configuration in response to an indication from the service manager 102, the service manager 102 may not know the specific changes made by the SDN controller 104.

The specific data that comprises the network topology can vary. For example, the network topology might specify the specific virtualized network functionalities that comprise the virtualized network functionalities 106 and the various connections between them. The network topology might also include information about the individual virtualized network functionalities, such as the particular function(s) performed and configuration options. For example, the network topology might indicate that the router 106c is a router and specify the number of "ports" the router 106c has and the queue depth of any queues used by the router 106c.

At stage G, the service manager 102 updates configuration-dependent network functionality in light of the updated network configuration. The specific configuration-dependent network functionality that is updated can vary based on the changes to the network configuration. For example, if the service manager 102 is monitoring the performance of the router 106c and the configuration change specified at stage C resulted in the release of the router 106c, then the service manager 102 stops monitoring the performance of the router 106c. As another example, consider a scenario in which the network traffic changes from streaming media to webpage data. In the case of streaming media, a gap in a data stream may be less tolerable than gaps in a data stream of webpage data. Thus, when the network traffic changes from streaming media to webpage data, the service manager 102 might monitor the maximum throughput of the service chain instead of the consistency of the data stream.

Although FIG. 1 depicts the operations of stage G as occurring at the service manager 102, the service manager 102 might also interact with the SDN controller 104 and the virtualized network functionalities 106. For example, the service manager 102 might deregister from some notifications no longer relevant or register for new notifications now relevant. As another example, the service manager 102 might deploy tests to be run by one of the virtualized network functionalities 106, the SDN controller 104, a hypervisor, etc.

Further, although the virtualized network functionalities 106 and the network devices 110 are depicted separately, the constituent components (load balancer 106a, firewall 106b, router 106c, and non-SDN devices 110a through 110n) can be interconnected. For example, router 106c, which is a virtualized router ("soft" router) might be configured to route traffic to one of more hardware routers that are part of the non-SDN devices 110a through 110n. Thus, the various operations performed at stages A through G can include operations that involve the network devices 110. For example, when the service manager 102 determines the network topology at stage F, the service manager 102 might determine that one or more of the components included in the network topology are network devices 110. Because the network devices 110 do not support SDN functionality, the service manager 102 might perform additional operations to determine information about the network devices 110. For example, the service manager 102 might transmit and receive SNMP messages to and from one or more of the network devices 110 to identify their functionality and determine their configuration. Similarly, the service manager 102 might perform operations to update the configuration of one or more of the network devices 110, detect conditions such as network problems associated with one or more of the network devices 110, etc.

Additionally, the service manager 102 can receive indications of configuration changes via mechanisms other than notifications from the SDN controller 104. For example, if a network administrator reconfigures the network devices 110 (e.g., adding or removing a network device), the network administrator might input the configuration change into a user interface communicatively coupled with the service manager 102. Additionally, the service manager 102 might monitor the network devices 110 in addition to the virtualized network functionalities 106. Typically, however, the service manager 102 actively monitors the network devices 110 instead of registering for notifications. For example, the service manager 102 might poll the network devices 110 at regular intervals to determine the status of the network devices 110, statistics associated with the network devices 110, etc. During this monitoring, the service manager 102 might determine that the configuration of one or more of the network devices 110 has changed.

The service manager 102 can perform operations similar to those described above when the service manager 102 determines that the network configuration has changed via a mechanism other than a notification from the SDN controller 104. Additionally, the service manager 102 can perform additional operations or variations of the operations described above. For example, the service manager 102 might determine that the configuration of the virtualized network functionalities 106 should be changed in response to a change to the network devices 110.

Additionally, although FIG. 1 depicts one SDN controller, the network 100 can include multiple SDN controllers. When the network 100 includes multiple SDN controllers, the service manager 102 and the SDN controllers can perform similar operations to those described above. The virtualized network functionalities managed by each SDN controller can be independent of each other or can be communicatively coupled. When the virtualized network functionalities of multiple SDN controllers are communicatively coupled, the operations of the service manager 102 can vary accordingly. For example, the service manager 102 might receive a notification of a network issue from a first SDN controller and, in response, direct a second SDN controller to modify the configuration of a virtualized network function.

The depictions of the SDN controller 104 and the set of virtualized network functionalities 106 in FIG. 1 are simplified in order to make the examples more clear. For example, the SDN controller 104 may comprise software on a server. The set of virtualized network functionalities 106 may be managed by a hypervisor (not depicted). The hypervisor may run on the same server as the SDN controller 104 or a different server. Further, although the network traffic is depicted at flowing between the individual virtualized network functionalities 106a through 106c, the set of virtualized network functionalities might include a virtual switch that receives network traffic output by a particular virtualized network functionality and routes it to the next virtualized network functionality in the service chain.

Figure 2:
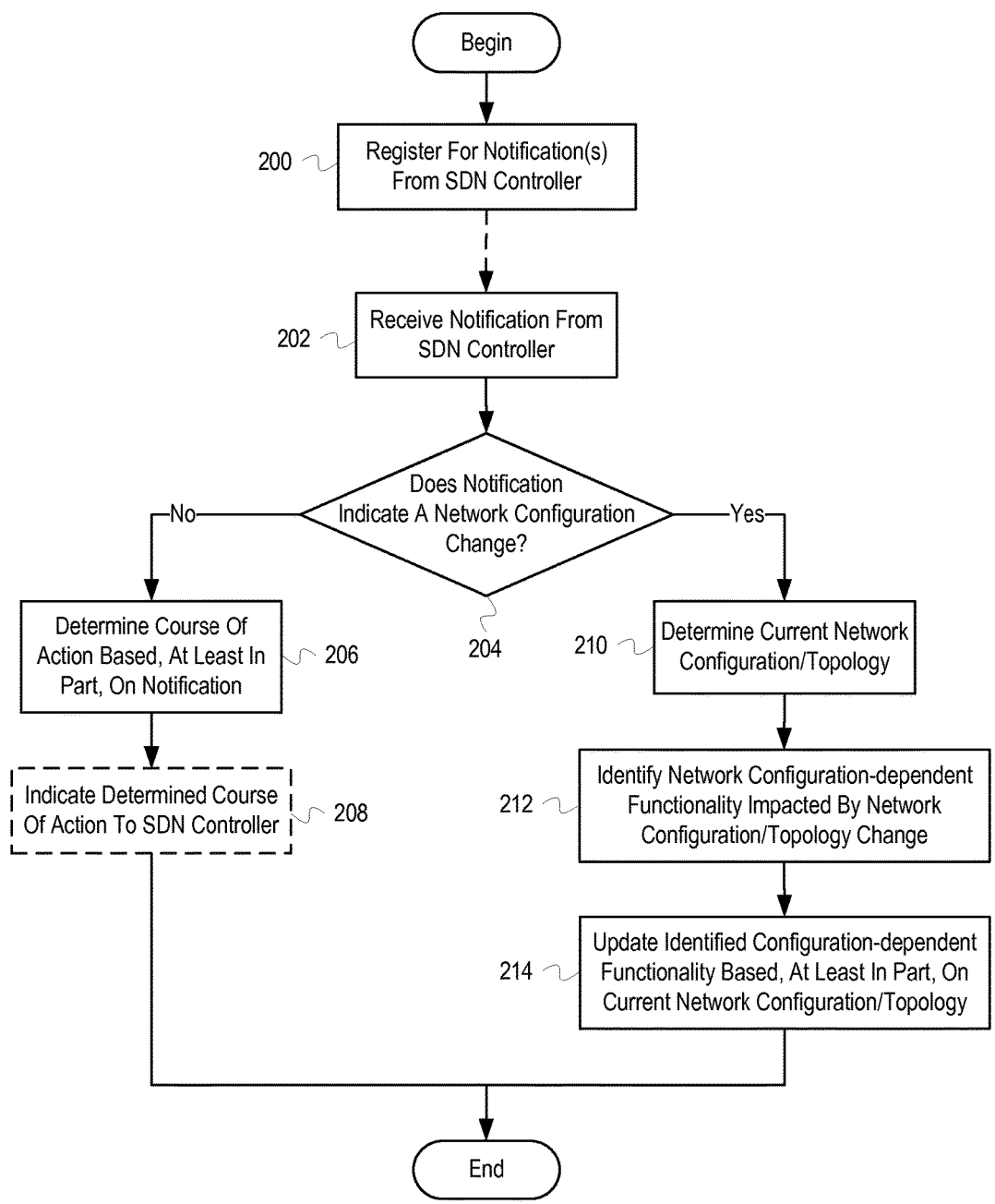
FIG. 2 depicts a flowchart of example operations for updating configuration-dependent network functionality based, at least in part, on a modified network configuration/topology.

FIG. 2 depicts a flowchart of example operations for updating configuration-dependent network functionality based, at least in part, on a modified network configuration/topology (hereinafter "network configuration"). The operations depicted in FIG. 2 assume that a service manager is communicatively coupled with an SDN controller, one or more components managed by the SDN controller (e.g., virtualized network functionalities), and one or more non-SDN components. The service manager, SDN controller, and components (both SDN and non-SDN) comprise a network.

To update configuration-dependent network functionality, the service manager registers for one or more notifications from an SDN controller (200). To register for the notification(s), the service manager sends a registration request to the SDN controller. As described above, the particular notifications registered for can include network statistics, network configuration changes, etc. The registration request can vary accordingly. Additionally, the registration request can conform to one or more protocols implemented by both the service manager and the SDN controller.

After registering for one or more notifications (200), the service manager receives a notification from the SDN controller (202). The notification can conform to the registration request sent to the SDN controller (200) or another registration request sent to the SDN controller by the service manager. For example, if the service manager registers for network configuration changes, the notification might be an indication of a network configuration change. Accordingly, the notification can include an indication of a notification type, such as a predetermined identifier. The notification can include other information related to an event that resulted in the notification. For example, if the notification indicates a network configuration change, the notification can indicate the specific configuration change that was made. In some instances, the notification might be an aggregate notification. For example, the SDN controller might limit the number of notifications sent to the service manager. Thus, instead of sending multiple individual notifications over a period of time, the SDN controller might send a single notification that includes information that would otherwise have been sent with each of the individual notifications. Generally, the notification is received asynchronously in relation to the registration request sent (200), as indicated by the dotted line. Thus, the notification might be received at any point after the registration request is received by the SDN controller and before deregistering for the particular notification type.

The service manager determines whether the notification indicates a network configuration change (204). To determine whether the notification indicates a network configuration change, the service manager can analyze the information included in the notification. As described above, the notification can include a notification type. The service manager can thus compare the notification type with the predetermined value that indicates a notification related to a network configuration change. If the notification type is the same as the predetermined value, the service manager determines that the notification indicates a network configuration change.

If the service manager determined that the notification does not indicate a network configuration change (204), the service manager determines a course of action based, at least in part, on the notification (206). To determine the course of action, the service manager analyzes the information included with the notification. For example, the notification might be associated with a particular event, such as a network-related measurement surpassing or falling below a particular threshold, detection of a component (e.g., virtualized network functionality) failure, etc. Thus, the service manager can determine the particular event or other criteria that resulted in the notification. To determine the particular event or criteria that resulted in the notification, the service manager can analyze the notification type, as described above, or additional information included in the notification.

For example, the notification type might indicate that a component failure occurred and additional information in the notification might indicate the particular component that failed.

The course of action is determined based on the analysis of the notification and can vary depending on the notification type, one or more conditions of the network, and other criteria. For example, if the notification indicates a component failure, the course of action might be to provision a component to replace the failed component or reconfigure the network to allow traffic to bypass the failed component. As another example, if the notification indicates that the average throughput of a service chain has decreased below a particular threshold, the course of action might be to modify the network configuration such that the service chain throughput increases above the particular threshold. In some instances, the service manager determines that no course of action is to be taken (i.e., the service manager determines that the course of action is to take no action).

If the service manager determined that no action is to be taken (206), the process ends.

If the service manager determined that action is to be taken (206), the service manager indicates the determined course of action to the SDN controller (208). The particular mechanism used by the service manager to indicate the determined course of action to the SDN controller can vary. For example, the service manager and the SDN controller might implement a particular protocol or standard that specifies predetermined course of action. In such instances, the service manager might indicate the particular course of action by sending a message that conforms to the protocol or standard to the SDN controller. As another example, the service manager might issue a set of one or more command(s) that, when performed by the SDN controller, result in the implementation of the course of action. For example, if the course of action is to provision an alternate service chain, the service manager might issue commands for the SDN controller to provision the components of the alternate service chain and communicatively couple the components accordingly. After the service manager indicates the determined course of action to the SDN controller, the process ends.

If the service manager determined that the notification indicates a network configuration change (204), the service manager determines the current network configuration (210). To determine the current network configuration, the service manager sends one or more message(s) to the SDN controller or one or more component(s) that make up the network. For example, the service manager may send the SDN controller a message requesting information on each component managed by the SDN controller, including information indicating how the components are interconnected. In some instances, the SDN controller might not be capable of providing particular information about a component to the service manager. Thus, the service manager might request the information directly from the particular component. Similarly, for components not managed by the SDN controller (e.g., non-SDN components), the service manager might send one or more message(s) directly to the components. In some instances, the service manager might not have access to a particular component, and thus may indirectly determine information about the component. For example, the service manager might be able to determine that a first router is communicatively coupled to a second router by using a "traceroute" tool/protocol without requesting the information directly from the first router.

The service manager may perform additional operations to determine the current network configuration. For example, in networks that include both SDN components and non-SDN components, an SDN controller might not be capable of providing the network configuration of the non-SDN components. Thus, the service manager may process the information received from the various network components to build a more complete view of the current network configuration.

The service manager identifies configuration-dependent network functionality impacted by the network configuration change (212). Configuration-dependent network functionality is functionality which may vary based on the particular configuration of the network. The functionality may vary based on configuration settings of one or more components, the particular network topology, etc.

One particular example of configuration-dependent network functionality is network monitoring. The service manager might monitor various aspects of the network, such as component availability and performance. For example, various components of the network might maintain statistics about throughput, data rate, errors, etc. The service manager may periodically check the statistics to ensure that the various measurements meet particular goals. If particular components are removed from the network or added to the network, the network monitoring is updated to take the removed/added components into account.

Another example of configuration-dependent network functionality is network testing. Although network testing may be used to assist network monitoring, network testing can function independently as well. For example, while network monitoring might be more appropriate for determining the current state of the network, network testing can allow the service manager to measure potential states of the network. For example, assume that the network is associated with a service-level agreement (SLA) specifying that the network should support a particular throughput. If the network is currently under a sub-maximal load, the current throughput of the network may not reflect the maximum throughput of the network. Thus, the service manager may periodically simulate an increased load on the network to determine whether the network throughput can support the throughput specified by the SLA.

Configuration-dependent network functionality impacted by the network configuration change can be any available configuration-dependent network functionality, whether active or not. For example, the network managed by the service manager might be a secondary/fail-over network used if a primary network fails. Thus, the service manager may update the network to reflect changes to the primary network, but might not actively monitor or test the network. However, if the primary network suffers a failure and the network begins to receive traffic, the service manager may begin to actively monitor or test the network. Thus, even though the testing and monitoring functionality is configuration-dependent, it may not be active prior to determining that the network configuration changed (e.g., the network became active).

To identify the network configuration-dependent network functionality, the service manager can maintain metadata that relates particular aspects of the network configuration with network configuration-dependent network functionality. For example, each time a network test is deployed, the service manager might record an indication of the network test and each component associated with the network test. Thus, if the notification received (202) indicates that a component was removed, the service manager can search through the indications to identify network tests associated with the removed component. As another example, the service manager might access predetermined (static or configurable) data that identifies particular network configuration-dependent network functionality. For example, if the notification received (202) indicates that the network traffic for a particular service chain has changed to a different type of data (e.g., from streaming media to webpage data), the service manager might query a database for network configuration-dependent network functionality that should be modified when the network traffic changes data types.

The service manager updates the identified configuration-dependent network functionality based, at least in part, on the current network configuration (214). For example, if the service manager identified a set of tests that are associated with a removed component, the service manager can modify or remove the tests accordingly. In some instances, the particular updates to perform are predetermined (static or configurable). For example, the service manager might perform a particular set of operations each time a component is added to the network. As another example, the service manager might search a database or other data source for indications of the operations to perform based, at least in part, on the current network configuration or information in the notification. After the service manager updates the identified configuration-dependent network functionality, the process ends.

Virtualized Network Functionality Lifecycle Example Illustration

As described above, the particular interactions between a service manager and an SDN controller can vary. For example, a service manager may monitor some aspects of the network while an SDN controller may monitor other aspects. An example of a virtualized network functionality lifecycle can more clearly illustrate some of these variations.

Figure 3:
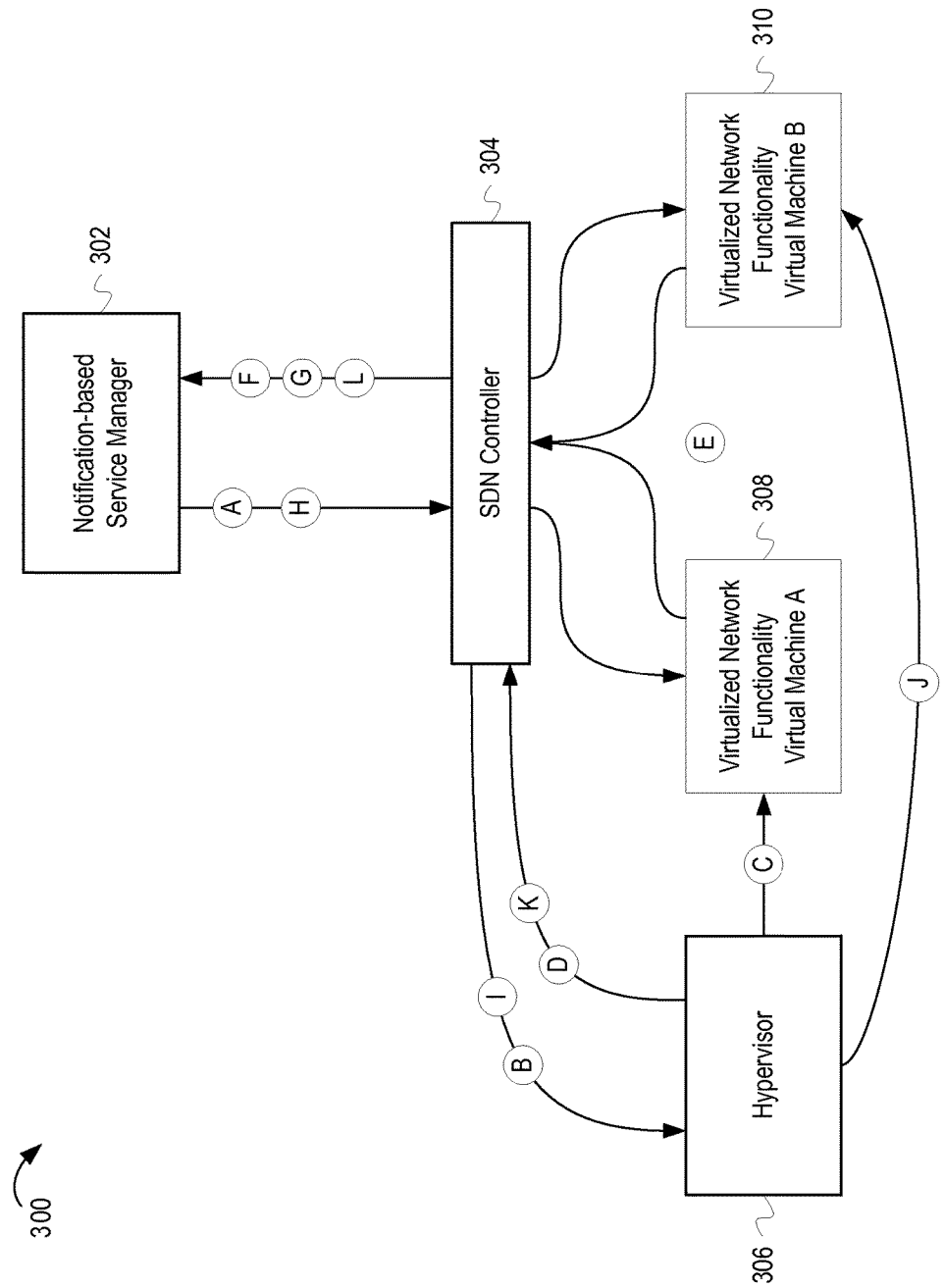
FIG. 3 depicts example operations of a service manager over the lifecycle of a virtualized network functionality.

FIG. 3 depicts example operations of a service manager over the lifecycle of a virtualized network functionality. FIG. 3 depicts a subset of a network 300 including a service manager 302, an SDN controller 304, and a hypervisor 306. The virtualized network functionality is implemented using a virtual machine (VM) managed by the hypervisor 306. In particular, the virtualized network functionality is implemented by one of virtualized network functionality VM A 308 or virtualized network functionality VM B 310, depending on the point in the lifecycle (as described in more detail below). Initially, neither virtualized network functionality VM A 308 nor virtualized network functionality VM B 310 are provisioned. Additionally, various details described above are not repeated for FIG. 3. For example, it is assumed that the service manager 302 has previously registered for the notifications sent by the SDN controller 304 to the service manager 302.

At stage A, the service manager 302 requests that the SDN controller 304 provision a particular virtualized network functionality. For example, the service manager 302 might provision a virtualized router for use in a network or a virtualized traffic analyzer for use in a service chain.

At stage B, the SDN controller 304 requests that the hypervisor 306 provision a new VM for the virtualized network functionality. In some instances, the hypervisor 306 has a set of template VMs that the SDN controller 304 selects from. The template VMs might be preconfigured with particular configurations and functionality that can be modified by the SDN controller 304 according to the particular request from the service manager 302. In some instances, the SDN controller 304 provisions a bare VM from the hypervisor 306 by specifying the configuration of the VM and providing the functionality (e.g., operating system and other software) to be loaded onto the VM.

At stage C, the hypervisor 306 provisions virtualized network functionality VM A 308 based, at least in part, on the request from the SDN controller 304. The hypervisor 306 configures, loads the appropriate functionality on, and initializes the boot process for virtualized network functionality VM A 308.

At stage D, the hypervisor 306 notifies the SDN controller 304 that virtualized network functionality VM A 308 has been provisioned. In some instances, the hypervisor 306 notifies the SDN controller 304 after virtualized network functionality VM A 308 has completed booting. In some instances, the hypervisor 306 notifies the SDN controller 304 prior to the completion of the boot process. The hypervisor 306 provides the SDN controller 304 with one or more identifiers for the virtualized network functionality VM A 308. For example, the hypervisor 306 might provide an identifier that the SDN controller 304 can use to identify virtualized network functionality VM A 308 when interacting with the hypervisor 306. As another example, the hypervisor 306 might provide an identifier that allows the SDN controller 304 to communicate with virtualized network functionality VM A 308, such as an IP address.

At stage E, the SDN controller 304 determines that virtualized network functionality VM A 308 is available and begins monitoring virtualized network functionality VM A 308. Virtualized network functionality VM A 308 might be available when the hypervisor 306 notifies the SDN controller 304 that virtualized network functionality VM A 308 has been provisioned (e.g., if the hypervisor 306 waits to notify the SDN controller 304 until after the virtualized network functionality VM A boot process has completed). In some instances, virtualized network functionality VM A 308 is not available when the hypervisor 306 notifies the SDN controller 304 that virtualized network functionality VM A 308 has been provisioned. In such instances, the SDN controller 304 might perform operations to determine when virtualized network functionality VM A 308 becomes available, such as "pinging" an IP address associated with virtualized network functionality VM A 308. To begin monitoring virtualized network functionality VM A 308, the SDN controller 304 might register with virtualized network functionality VM A 308, direct virtualized network functionality VM A 308 to begin execution of certain operations, etc. The monitoring operations continue until otherwise terminated by the SDN controller 304, virtualized network functionality VM A 308, or other mechanism. In this particular example, it is assumed that the monitoring operations continue to be performed until terminated by the SDN controller 304.

At stage F, the SDN controller 304 notifies the service manager 302 that the virtualized network functionality has been provisioned. The SDN controller 304 may include information identifying virtualized network functionality VM A 308 as the particular VM implementing the virtualized network functionality. Upon receiving the notification that the virtualized network functionality has been provisioned, the service manager 302 can calculate the startup provisioning latency. The startup provisioning latency is the time between when the service manager 302 requested the virtual network functionality be provisioned at stage A and when the SDN controller 304 notifies the service manager 302 that the virtualized network functionality has been provisioned.

At stage G, the SDN controller 304 detects a "stall" in the operation of virtualized network functionality VM A 308 and notifies the service manager 302. A "stall" is referred to as "operational latency" and occurs when one or more task(s) or operation(s) performed by virtualized network functionality VM A 308 exceed a threshold. Operational latency is an example of a measurement that might be better monitored by the SDN controller 304, whereas startup provisioning latency can be monitored by either the SDN controller 304 or the service manager 302. Consider, for example, some of the characteristics of the two measurements. Startup provisioning latency occurs at a discrete point of the VM lifecycle and can be determined based on readily available information, such as notifications that a particular VM has been provisioned. Operational latency, on the other hand, can occur at any point during most of the VM lifecycle. Thus, to determine operational latency, the target VM is more actively monitored than when determining the startup provisioning latency. While the service manager 302 can determine the startup provisioning latency with little to no overhead, allowing the service manager 302 to monitor for operational latency might result in significant overhead. Thus, in this example, the SDN controller 304 monitors for operational latency and notifies the service manager 302 upon detecting the operational latency instead of allowing the service manager 302 to monitor for operational latency directly. This varies from the startup latency, which is monitored by the service manager 302 instead of the SDN controller 304.

At stage H, the service manager 302 indicates to the SDN controller 304 that the performance of the virtualized network functionality is to be increased. For example, the service manager 302 might receive a notification from the SDN controller 304 indicating that the processor usage of virtualized network functionality VM A 308 has exceeded a certain threshold for a certain length of time. The service manager 302 might thus determine that virtualized network functionality VM A 308 is insufficient to meet a particular SLA.

At stage I, the SDN controller 304 notifies the hypervisor 306 that a new VM should be provisioned and that the virtualized network functionality should be migrated to the newly provisioned VM. As described above, the specific mechanism used by the SDN controller 304 can vary. However, in this instance, the SDN controller 304 at least specifies that the newly provisioned VM should have greater performance than virtualized network functionality VM A 308.

At stage J, the hypervisor 306 provisions virtualized network functionality VM B 310 based, at least in part, on the request from the SDN controller 304. The hypervisor 306 configures virtualized network functionality VM B 310 and migrates the functionality from virtualized network functionality VM A 308 to virtualized network functionality VM B 310.

At stage K, the hypervisor 306 notifies the SDN controller 304 that virtualized network functionality VM B 310 has been provisioned. In some instances, the hypervisor 306 notifies the SDN controller 304 after virtualized network functionality VM B 310 has completed booting. In some instances, the hypervisor 306 notifies the SDN controller 304 prior to the completion of the boot process. The hypervisor 306 provides the SDN controller 304 with one or more identifiers for the virtualized network functionality VM B 310. For example, the hypervisor 306 might provide an identifier that the SDN controller 304 can use to identify virtualized network functionality VM B 310 when interacting with the hypervisor 306. When the functionality is migrated to virtualized network functionality VM B 310, virtualized network functionality VM B 310 is typically accessible via the same IP address as originally assigned to virtualized network functionality VM A 308.

At stage L, the SDN controller 304 notifies the service manager 302 that the performance of the virtualized network functionality has been increased. Upon receiving the notification that the performance of the virtualized network functionality has been increased, the service manager 302 can calculate the upgrade latency. The upgrade latency is the time between when the service manager 302 requested the performance of the virtual network functionality be increased at stage H and when the SDN controller 304 notified the service manager 302 that the performance of the virtualized network functionality has been increased.

Although not depicted, the service manager 302 can indicate to the SDN controller 304 that the virtualized network functionality is no longer needed. Similar to the operations described above, the SDN controller 304 can request that the hypervisor 306 shutdown the associated VM. Once the SDN controller 304 has determined that the associated VM has been shut down, the SDN controller 304 can determine the shutdown latency. Similar to the startup latency, the shutdown latency measures the amount of time between a request to shut down virtualized network functionality and when the associated VM is shut down.

Although FIG. 3 depicts the upgrade of the virtualized network functionality as including a migration between VMs, upgrades may reuse the same VM. A similar measurement, the migration latency, can be used when the service manager 302 determines that a migration of the virtualized network functionality is performed. Thus, the upgrade latency can implicitly include the migration latency.

Additionally, although the example above defines various measurements in particular ways, measurement definitions can vary. For example, the startup provisioning latency can be defined as the time between when the SDN controller 304 requests that the hypervisor 306 provision a VM that implements the virtualized network functionality. Other measurements can vary accordingly.

Variations

The startup latency, shutdown latency, migration latency and upgrade latency are examples of possible measurements. The service manager 302 can measure other aspects of the network 300 as well. For example, the service manager 302 can track compliance with a placement policy or a provisioning reliability. The service manager 302 can also track clock error associated with provisioned VMs and how frequently virtualized network functionalities are released prematurely. The service manager 302 can track similar measurements when provisioning multiple virtualized network functionalities. For example, the service manager 302 might provision an entire service chain comprising multiple virtualized network functionalities. In some instances, the hypervisor 306 might be more or less efficient when provisioning multiple virtual machines or virtualized network functionalities than individual virtual machines or virtualized network functionalities.

Various network-related measurements can be used to monitor/test a network/service chain of virtualized network functionalities. For example, as described above, throughput can be measured (maximum, average, minimum, etc.). Additionally, packet delay, packet jitter, packet loss, etc. can be measured. The measurements can include both virtualized network functionalities and non-SDN devices.

Although the descriptions herein refer to ensuring that SLAs are met in general terms, the actual functionality implemented to do so can vary. For example, an SLA might be specified in high level terms, such as specifying a particular throughput that the network should support for a specific number of users. However, the actual measurements and testing implemented might be more complex. For example, consider a network that supports multiple traffic classes, such as a network used by cellular phones. Cellular phone use can include audio, video, and general data. To support the different classes of traffic (audio, video, and general data), the network might include a traffic classifier that routes the traffic to different service chains optimized for each traffic class. Thus, to ensure that the SLA is met, a service manager might monitor and test each of the service chains individually. The tests and measurements for the service chains might vary depending on the particular traffic class.

The measurements described herein can be used individually or in combination with each other to measure "quality of service". For example, the quality of service of for streaming video might be defined by measurements that might result in dropped video frames, such as packet loss. The quality of service for general data, such as web data, might be defined by minimum throughput, since dropped packets or packet jitter generally does not matter as long as the throughput is sufficient. Quality of service measurements can be incorporated into SLAs similarly to other measurements.

The networks depicted herein can comprise any kind of network, including local area networks, wide area networks, etc. The networks can include the Internet and can be implemented as "cloud"-based networks. Some portions of the network might be located in one location while other portions are located in other locations. For example, in some implementations, a service manager is located within the same data center as an SDN controller. In some implementations, the service manager is located in a different location than the SDN controller. Further, the particular location of components within the network can vary over time.

Normalized SDN Interface Example Illustrations

Because SDN and network function virtualization is fairly new, there are many different solutions available. For example, no standard protocol has been established (such as SNMP), and various manufacturers and groups have developed competing solutions. Many of the solutions offer different features and are incompatible with others. Further, networks can include virtualized network functionality that support different SDN protocols.

A normalized SDN interface (hereinafter "SDN interface") can present a single, consistent SDN interface, adapting messages received at the SDN interface to the individual SDN protocols implemented by SDN managers and SDN devices. The SDN interface thus allows a service manager and other components to implement a single protocol, simplifying the network management functionality and operations. The SDN interface can include individual, "pluggable" adapters for each of the particular SDN protocols used by the virtualized network functionality available to the service manager.

Adapting a message typically involves performing one or more operations on a received message to generate a message of a different format or containing different data. For example, various values specified by a first SDN protocol may be translated into other values specified by a second SDN protocol. Similarly, various values specified by the first SDN protocol may be transformed into other values specified by the second SDN protocol. As used herein, the term "translate" refers to mapping one set of values to another set of values while the term "transform" refers to performing one or more operations on one or more values to generate one or more other values. For example, transforming might involve splitting a value into two values based on a pre-defined delimiter. Because transforming can include translating, the use of the term "transform" includes translation operations.

Figure 4:
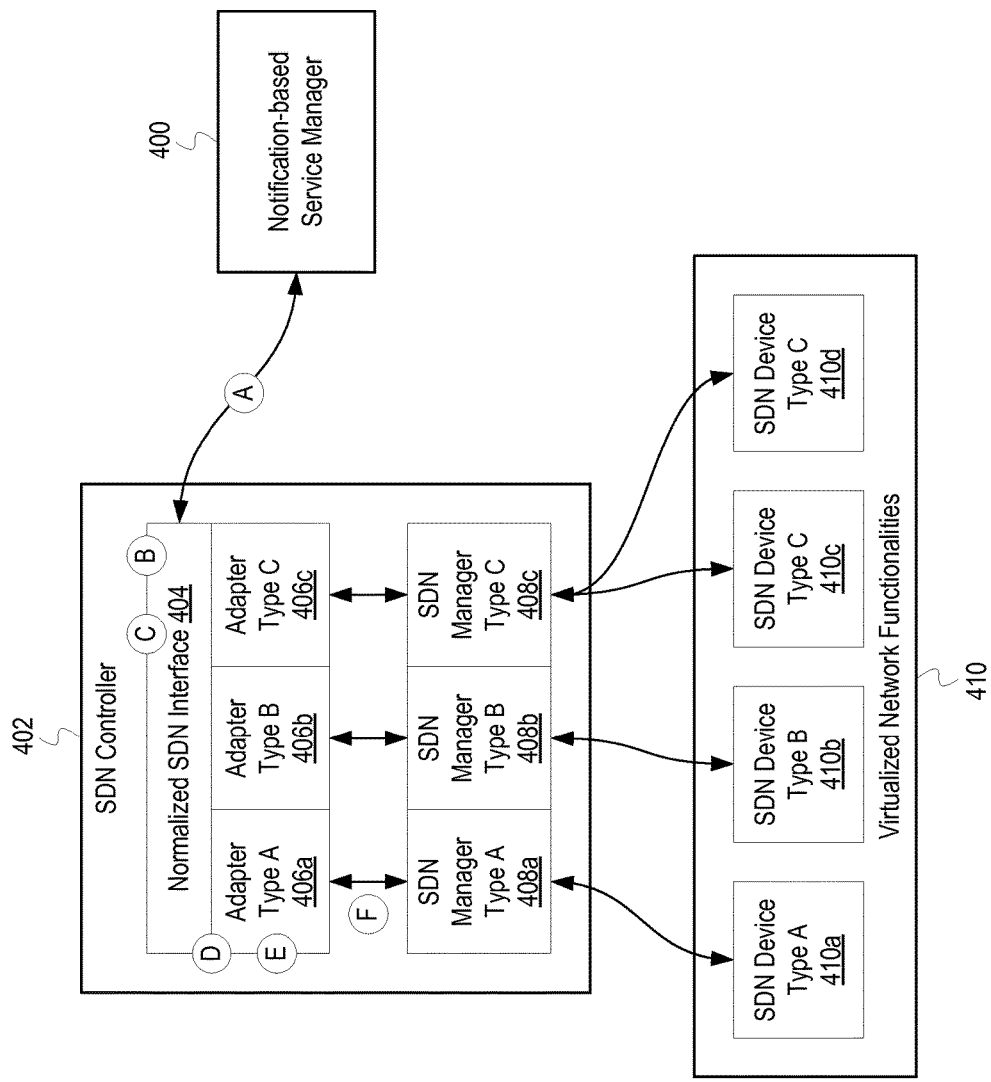
FIG. 4 depicts an example SDN controller that includes a normalized SDN interface and adapters for various SDN managers.

FIG. 4 depicts an example SDN controller that includes an SDN interface and adapters for various SDN managers. FIG. 4 depicts a service manager 400, an SDN controller 402, and a set of virtualized network functionalities 410. The SDN controller 402 includes an SDN interface 404 and a set of adapters 406a through 406c. The SDN controller 402 also includes a set of SDN managers 408a through 408c. The set of virtualized network functionalities 410 includes SDN devices 410a through 410d.

Generally, SDN controller configurations can vary. In this example, the SDN controller 402 is a computing system, such as a server, VM, or mainframe, that includes one or more SDN managers (SDN managers 408a through 408c, specifically). Additionally, the SDN controller 402 includes the SDN interface 404 and the adapters 406a through 406c. In some instances, the SDN interface 404 and the adapters 406a through 406c are located on a separate computing system and communicatively coupled with the SDN controller 402 over a network (not depicted). Similarly, in some instances, the SDN managers 408a through 408c can be located on different SDN controllers.

In this example, each of the SDN managers 408a through 408c and the SDN devices 410a through 410d are indicated as belonging to a particular "type" (in this example, either 'A', 'B', or 'C'). The type identifies a particular SDN protocol implemented by the respective SDN manager and associated SDN device(s). Thus, for example, SDN manager 408a and SDN device 410a, both type 'A', implement a particular SDN protocol. Each of the protocols implemented by the different types include some differences, but some might be partially compatible. A type can be assigned to a particular SDN manager when the SDN interface 404 is configured to operate with the particular SDN manager. For example, the SDN interface 404 might read configuration data when the SDN interface 404 is initialized. The configuration data can include indications of the SDN managers 408a through 408c. The SDN interface 404 can then assign a type to each of the SDN managers 408a through 408c based on the configuration data or by communicating with the SDN managers 408a through 408c themselves.

At stage A, the service manager 400 sends a message to the SDN interface 404. The message identifies at least one of the SDN managers 408a, 408b, or 408c or at least one of the SDN devices 410a, 410b, 410c, or 410d as a message destination. The message conforms to a format supported by the SDN interface 404. The particular message can vary. For example, the message might indicate that an SDN device should be provisioned, migrated, or released; request particular information about an SDN device; or request information about the capabilities of an SDN manager. In this example, the service manager 400 identifies SDN manager 408a as the message destination.

At stage B, the SDN interface 404 identifies the message destination and a type associated with the message destination. As mentioned above, the message identifies the message destination. The message can specify the message destination by including an identifier associated with the destination, such as an IP address, MAC address, etc. Thus, to determine the message destination, the SDN interface 404 can read the identifier included in the message. If the message destination is an SDN device, the SDN interface 404 further determines which of the SDN managers 408a through 408c manages the SDN device. To determine which SDN manager is associated with the destination SDN device, the SDN interface 404 can analyze metadata associated with the destination SDN device. For example, the SDN interface 404 might maintain a map that identifies each of the SDN managers 408a through 408c and indicates which of the SDN devices 410a through 410d are managed by which of the SDN managers. Thus, the SDN interface 404 can locate an identifier associated with the destination SDN device in the metadata and determine which SDN manager maps to the destination SDN device.

Similarly, to determine the type associated with the message destination, the SDN interface 404 can access metadata associated with the message destination. For example, the type might be indicated in configuration data read by the SDN interface 404, as described above. In some instances, the type might be stored with other metadata associated with the message destination, such as the metadata that maps the SDN managers 408a through 408c to the respective SDN devices. As described above, the message destination in this example is SDN manager 408a. The SDN interface 404 thus determines that SDN manager 408a corresponds to type 'A'.

At stage C, the SDN interface 404 identifies an adapter of adapters 406a through 406c that corresponds to the type associated with the message destination. To identify the appropriate adapter, the SDN interface 404 can analyze metadata that maps adapters to adapter types. For example, each of the adapters 406a through 406c might be associated with a configuration file or entry in a database that indicates the particular type associated with the respective adapter. Thus, the SDN interface 404 can search the metadata and identify the adapter associated with the same type as the message destination. If no adapter is associated with the same type as the message destination, the SDN interface 404 can identify a default adapter, indicate the occurrence of an error, etc. Because the SDN interface 404 identified SDN manager 408a as the message destination and determined that SDN manager 408a is associated with type 'A', the SDN interface identifies adapter 406a.

At stage D, the SDN interface 404 sends the message to adapter 406a, which was identified at stage C as corresponding to the same type as the message destination. To send the message to adapter 406a, the SDN interface 404 can pass a reference to the message via function call, inter-process messaging, etc. In some implementations, the SDN interface 404 may pass the entire message to adapter 406a.

At stage E, adapter 406a transforms the message into a message compatible with SDN manager 408a. The particular operations performed by the adapter 406a can vary based on the message type, the contents of the message, the particular protocol implemented by the SDN interface 404, the particular protocol implemented by the SDN manager 408a, etc. For example, both the SDN interface 404 and the SDN manager 408a might implement a "provision" command to be used when an SDN device is to be provisioned. However, the SDN interface 404 might identify the command using a first value, while the SDN manager 408a identifies the command using a second value. Thus, when adapter 406a receives a message that identifies the first value, the adapter 406a might create a new message using the second value. The adapter 406a can perform similar translations for other identifiers and values in the message. Further, the adapter 406a might transform the message into a different format. For example, the SDN interface 404 might use an eXtensible Markup Language (XML) format while the SDN manager 408a uses a JavaScript Object Notation (JSON) format. Various fields in the message might be combined into fewer fields or split into multiple fields. Similarly, the message might be transformed into multiple messages. For example, the protocol implemented by the SDN manager 408a might include two commands, one to provision the actual SDN device and one to boot the SDN device. The SDN interface 404, on the other hand, might only implement a command to provision an SDN device. Thus, if the adapter 406a receives a "provision" command from the SDN interface 404, the adapter 406a might create a "provision" command compatible with the SDN manager 408a in addition to a "boot" command.

At stage F, the adapter 406a sends the transformed message(s) to the SDN manager 408a. The particular mechanism used to send the transformed message(s) to the SDN manager 408a can vary. For example, the adapter 406a might open a Hypertext Transfer Protocol (HTTP) connection with the SDN manager 408a and send the transformed message(s) via the HTTP connection. In some instances, the adapter 406a might send the transformed message(s) using function calls, inter-process messages, etc.

Although not depicted, the adapters 406a through 406c also transform messages received from the SDN managers 408a through 408c. Thus, for example, the SDN interface 404 might receive a message from the SDN manager 408a, identify adapter 408a as being associated with type 'A', and pass the message to the adapter 408a to be transformed. The adapter 408a then sends the message to the service manager 400. The operations performed by the SDN interface 404 and the adapter 408a when receiving a message from the SDN manager 408a can be similar to those performed when receiving a message from the service manager 400.

In some instances, the adapters 406a through 406c do not send the messages directly to the destination (e.g., SDN manager 408a). Instead, the adapters 406a through 406c transform the message as described above and then pass the transformed message(s) back to the SDN interface 404 or to another component. The SDN interface 404 or other component then sends the message to the destination.

Although the SDN managers 408a through 408c are each associated with one or more SDN devices, one or more of the SDN managers 408a through 408c might not be associated with any SDN devices at a particular point in time. For example, prior to any type B SDN device being provisioned, SDN manager 408b might not manage any SDN devices.

Figure 5:
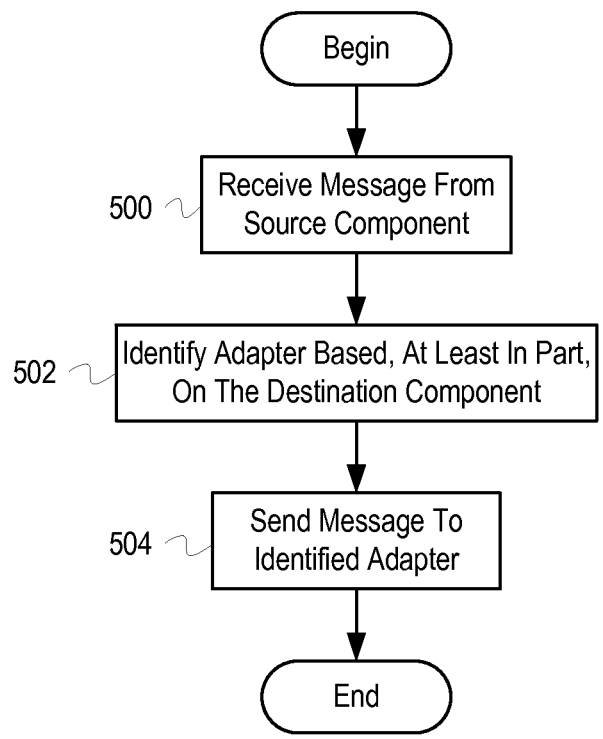
FIG. 5 depicts a flowchart of example operations for identifying an adapter for transforming a message from a first SDN-related protocol to a second SDN-related protocol.

FIG. 5 depicts a flowchart of example operations for identifying an adapter for transforming a message from a first SDN-related protocol to a second SDN-related protocol. The operations depicted in FIG. 5 can be performed by an SDN interface or any suitable component.

An SDN interface first receives a message from a source component (500). The SDN interface can receive the message via an API, inter-process messaging, etc. The format and contents of the message generally conform to a first SDN-related protocol and can vary accordingly. Typically, the message identifies a destination component and a message type (e.g., command to perform an action, request for data, etc.). The message can also identify the source device and include additional information based on the message type, destination component, etc.

The SDN interface then identifies an adapter based, at least in part, on the destination component (502). To identify the adapter, the SDN interface can access metadata that maps the destination component to a particular adapter of a plurality of adapters. The particular metadata can vary. For example, the SDN interface might maintain a mapping table indexed by an identifier associated with the destination component, such as a component identifier, a model number, a protocol identifier, a protocol version number, etc. Thus, depending on the particular implementation, the mapping table might map multiple destination components to a particular adapter. For example, if multiple destination components implement a particular version of a particular protocol, the SDN interface might search the table for the protocol and the protocol version. The adapter can be identified in the mapping table by a name, path, or other identifier.

The SDN interface then sends the message to the identified adapter (504). The particular mechanism used to send the message to the identifier can vary depending on the implementation. For example, the SDN interface might load the adapter and send the message, or a reference to the message, via a function/method call. As another example, the adapter may run as a separate process or thread, and the SDN interface might send the message via inter-process messaging or using similar mechanisms. After the SDN interface sends the message to the identified adapter, the process ends.

As described above in relation to FIG. 4, the SDN interface can support bidirectional messaging. In other words, the operations described in FIG. 5 assume that the source component implements a particular SDN protocol (e.g., a normalized SDN protocol) while the destination component implements one of a plurality of protocols. However, the operations depicted in FIG. 5 can be adapted to allow a source component to implement on of a plurality of protocols while the destination component implements a particular SDN protocol. In particular, instead of identifying the adapter based, at least in part, on the destination component (502), the SDN interface can identify the adapter based, at least in part, on the source component. Additionally, the operations depicted in FIG. 5 can be adapted for implementations in which both the source component and the destination component can implement one of a plurality of protocols. In particular, instead of identifying the adapter based, at least in part, on the destination component (502), the SDN interface can identify the adapter based, at least in part, on both the source component and the destination component. Such an implementation can allow the SDN interface to facilitate communications between SDN devices in addition to communications between a service manager and SDN devices.

Figure 6:
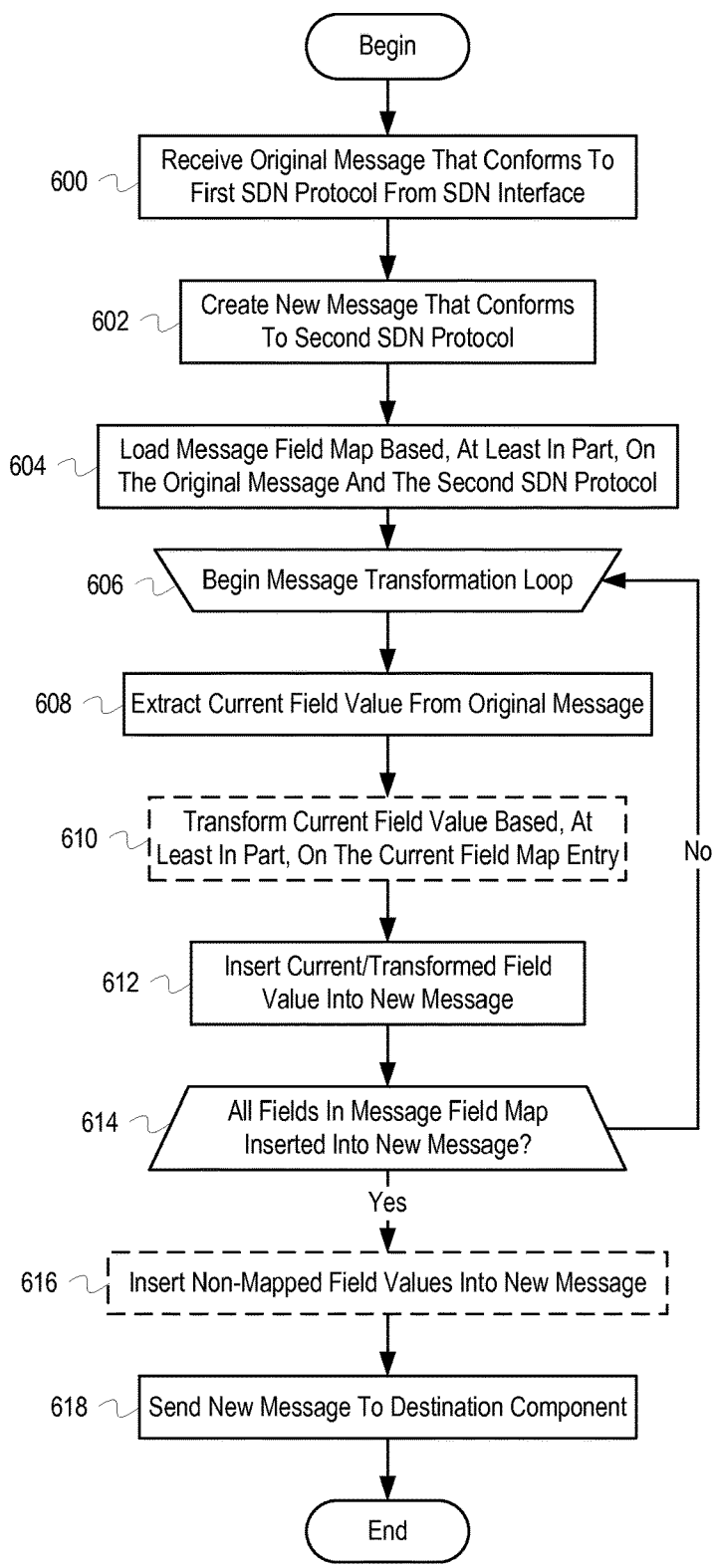
FIG. 6 depicts a flowchart of example operations for transforming a message from a first SDN protocol to a second SDN protocol.

FIG. 6 depicts a flowchart of example operations for transforming a message from a first SDN protocol to a second SDN protocol. The operations depicted in FIG. 6 can be performed by an adapter or any suitable component.

An adapter first receives an original message conforming to a first SDN protocol from an SDN interface (600). The original message typically identifies a destination component and a message type, but can vary in accordance with the first SDN protocol. The original message can include other information that can vary depending on the destination component, message type, and other parameters.

The adapter creates a new message conforming to a second SDN protocol (602). For example, if the second SDN protocol specifies that messages should be in an XML format, the adapter creates a new XML message.

The adapter loads a message field map based, at least in part, on the original message and the second SDN protocol (604). The message field map maps message fields from a particular message type associated with the original message to a corresponding message type associated with the second SDN protocol. For example, if the original message is a command to provision an SDN device, the adapter loads a message field map that corresponds to a message for provisioning an SDN device according to the second SDN protocol.

The adapter begins a message transformation loop (606). During the message transformation loop, the adapter iterates through the message field map and transforms the corresponding message fields from the original message to corresponding message fields in the new message. At the beginning of the first iteration, the adapter initializes a current map entry to reference a first of the entries in the message field map. At the beginning of each subsequent iteration, the adapter updates the current map entry to reference a next map entry in the message field map. The current map entry identifies a current field in the original message and a current field in the new message, along with any operations to transform the current field in the original message to a format compatible with the second SDN protocol The adapter extracts the current field value from the original message (608). To extract the current field value from the original message, the adapter determines a field identifier based on the current map entry. The adapter can then read the value associated with the determined field identifier from the original message.

If the current field map entry specifies one or more operations for transforming the current field value, the adapter transforms the current field value based, at least in part, on the current field map entry (610). In particular, the current field map entry can specify one or more operations for transforming the current field value. For example, the current field map entry might specify that the current field value should be converted from an integer to a floating point value, that the current field value should be replaced by another value, etc.

If the current field map entry does not specify an operation for transforming the current field value or after the adapter transforms the current field value (610), the adapter inserts the current/transformed field value into the new message (612). In particular, the adapter identifies a field in the new message that corresponds to the current field from the original message. The adapter can identify the field based, at least in part, on the current field map entry. Once the adapter has identified the appropriate field in the new message, the adapter can store the current/transformed field value in the identified field.

The adapter determines whether all fields identified in the message field map have been inserted into the new message (614). If some fields identified in the message field map have not been inserted into the new message, the adapter begins an additional iteration of the message transformation loop.

If all fields identified in the message field map have been inserted into the new message and there are non-mapped fields to insert into the new message, the adapter inserts non-mapped field values into the new message (616). For example, the second SDN protocol might specify that a particular message has one or more fields that do not correspond to fields specified by the first SDN protocol. Thus, some fields specified by the second SDN protocol might not have mapping entries in the message field map. For these non-mapped fields, the adapter can insert appropriate values into the corresponding fields in the new message.

If all fields identified in the message field map have been inserted into the new message and there are no non-mapped fields to insert into the new message or after inserting non-mapped field values into the new message (616), the adapter sends the new message to the destination component (618). To send the new message, the adapter performs one or more operations in accordance with the second SDN protocol. After the adapter sends the new message to the destination component, the process ends.

In some instances, the field map entries might not directly specify the operations for transforming the field values of the original message to the field values of the new message. Instead, the field map entries might identify particular functions/methods that include the one or more operations for transforming the field values. For example, the adapter can identify a function/method associated with the current field value. The adapter can then pass the current field value as a parameter to the identified function/method. The identified function/method can then perform the one or more operations to transform the current field value and return the transformed value to the calling function/method. Relatedly, instead of maintaining a mapping table, the particular mappings between the fields of the original message and the fields of the destination message can be hardcoded or stored using a different data structure.

As mentioned above in relation to FIG. 4, an adapter might transform a first message compatible with a first SDN protocol into multiple messages compatible with a second SDN protocol. Similarly, an adapter might transform multiple messages compatible with a first SDN protocol into a single message compatible with a second SDN protocol. The operations depicted in FIGS. 5 and 6 can be adapted accordingly.

The particular messages supported by a particular SDN protocol can vary. The messages can correspond to various events that might occur during the lifecycle of an SDN device. For example, an SDN device might be requested/provisioned, configured, started/initiated, paused, maintained, reconfigured, stopped, released, or retired. Two different SDN protocols might support messages associated with differing combinations of these events.

Similarly, differing SDN protocols or different SDN managers might support different data requests. For example, a first SDN manager might maintain data about the historical performance of an SDN device managed by the first SDN manager. A second SDN manager, however, might not maintain data about the historical performance of the SDN device. An adapter can be used to normalize these differences. For example, an adapter for the second SDN manager might maintain the same data the first SDN manager maintains, thus providing a consistent view to a service manager regardless of the differences between the underlying SDN managers.

Although described separately, the SDN interface can function as the entity within an SDN controller that handles the registration/notification functionality. Thus, when the service manager described in FIGS. 1, 2, and 3 registers for notifications, the service manager might be registering with an SDN interface on the SDN controller. This can allow the SDN interface to emulate notification functionality for SDN managers that do not natively support notifications. Similarly, for SDN managers that do not support registering for a subset of notifications or otherwise provide a large volume of notifications, the SDN interface can filter out unwanted notifications.

Figure 7:
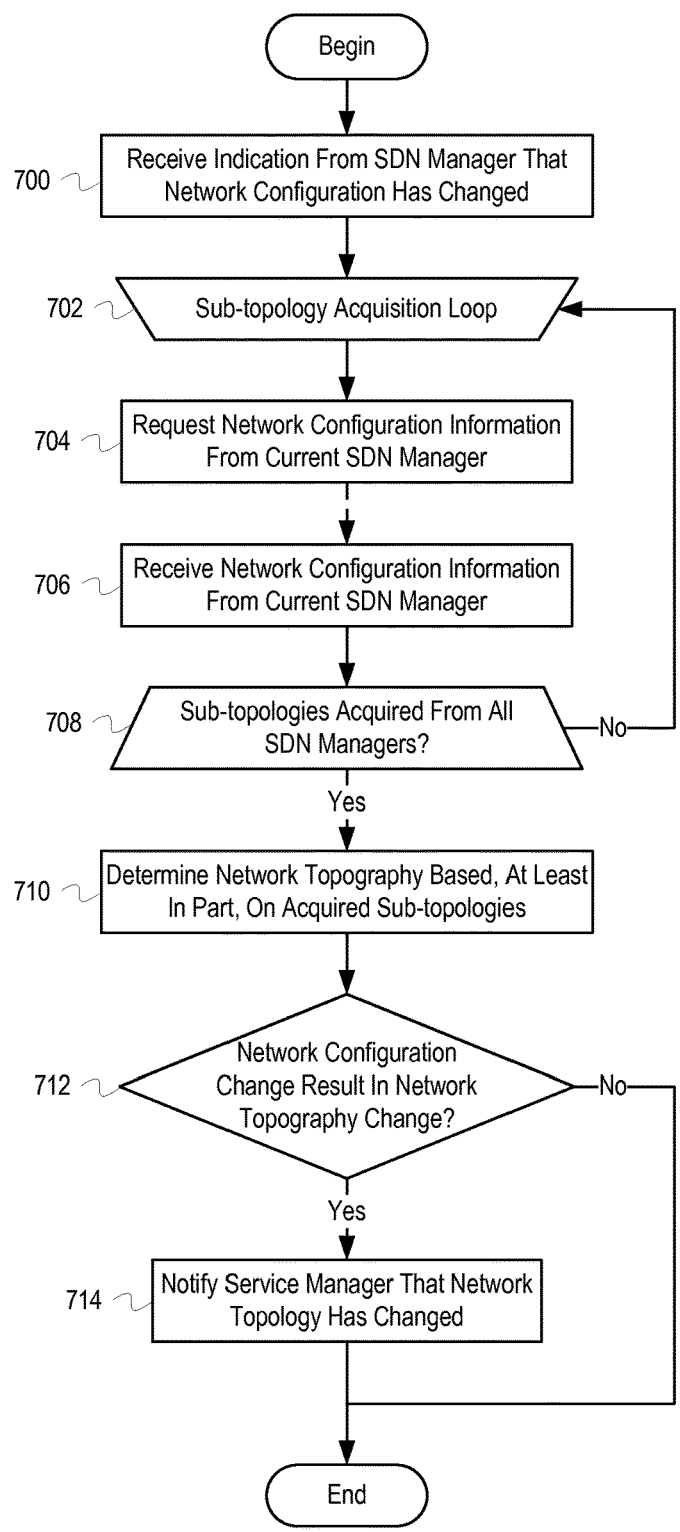
FIG. 7 depicts a flowchart of example operations for determining that a network topology changed and notifying registered components.

As mentioned above, an SDN interface can facilitate the functionality of a service manager. For example, the SDN interface provides a central entity that can monitor for network topology changes and notify the service manager when the network topology changes, instead of the service manager communicating with each of the SDN managers directly. FIG. 7 depicts example operations that can be performed by an SDN interface to facilitate service manager functionality.

FIG. 7 depicts a flowchart of example operations for determining that a network topology changed and notifying registered components. The operations depicted in FIG. 7 can be performed by an SDN interface or any suitable component.

First, an SDN interface receives an indication that a network configuration has changed from an SDN manager (700). The indication can be received as an asynchronous notification sent by the SDN manager or in response to a request from the SDN interface. The network configuration can identify the network configuration and include associated metadata.

After receiving the indication that the network configuration has changed from the SDN manager (700), the SDN interface begins a sub-topology acquisition loop (702). During the sub-topology acquisition loop, the SDN interface queries each of a plurality of SDN managers for network configuration information associated with the SDN devices managed by the particular SDN manager. At the beginning of the first iteration, the SDN interface can designate one of the SDN managers as the current SDN manager. At the beginning of subsequent iterations, the SDN interface can designate another, un-queried SDN manager as the current SDN manager.

Within the sub-topology acquisition loop, the SDN interface requests network configuration information from the current SDN manager (704). The particular network configuration information requested can vary depending on the current SDN manager. For example, different SDN managers may support requests for a limited amount of network configuration information. Similarly, while some SDN managers may allow the SDN interface to request specific network configuration information, other SDN managers may provide all available network configuration information in response to a request. Generally, the SDN interface requests network configuration information that will allow the SDN interface to construct the network topology associated with the SDN devices managed by the current SDN manager. This typically includes information identifying each SDN device managed by the SDN manager and one or more destinations for traffic leaving each of the components. Other information may be included, such as the function of each SDN device, indications of how much traffic is sent on each outbound path from an SDN device when there are multiple outbound paths, etc. In some instances, the SDN interface may request identification of each of the SDN devices managed by the current SDN manager and request the network configuration information directly from the SDN devices themselves.

The SDN interface receives the network configuration information from the current SDN manager (706) in response to the request for the configuration information (704). As indicated by the dashed line, the network configuration information can be received asynchronously. For example, instead of sending a request for the network configuration information and waiting until a response is received, the SDN interface can request network configuration information for multiple SDN managers regardless of whether any responses have been received. Additionally, the SDN interface can maintain metadata to track which current SDN managers network configuration information have been received from. For example, the SDN interface might maintain a list of the SDN managers and mark the entry for the current SDN manager.

At the end of each iteration of the sub-topology acquisition loop, the SDN interface determines whether sub-topologies have been acquired from all of the SDN managers (708). To determine whether sub-topologies have been acquired from all SDN managers, the SDN interface can determine whether all entries in the list of SDN managers are marked. If the SDN interface determines that sub-topologies have not been acquired from all of the SDN managers, the SDN interface begins another iteration of the sub-topology acquisition loop.

If the SDN interface determined that sub-topologies have been acquired from all of the SDN managers (708), the SDN interface determines the network topology based, at least in part, on the acquired sub-topologies (710). As indicated above, a sub-topology identifies the network topologies associated with a particular SDN device. Thus, to determine the network topology that includes all SDN devices, the SDN interface combines the sub-topologies to create the network topology. The specific operations performed to combine the network topology can vary depending on the format of the network topology and the sub topologies. For example, if the network topology is to be specified as a graph (with SDN devices as nodes and paths between SDN devices as edges), the SDN interface can identify outbound paths in sub-topologies with destinations that are not within that particular sub-topology. The SDN interface can then match the identified outbound paths with destinations in other sub-topologies, creating the appropriate edge, thus combining the sub-topologies.

The SDN interface determines whether the network configuration change resulted in a network topology change (712). To determine whether the network configuration change resulted in a network topology change, the SDN interface can compare the determined network topology with a previous network topology. If the network topologies differ, the network configuration change resulted in a network topology change. If the SDN interface determines that the network configuration change did not result in a network topology change, the process ends.

If the SDN interface determined that the network configuration resulted in a network topology change (712), the SDN interface notifies the service manager that the network topology has changed (714). To notify the service manager, the SDN interface accesses metadata that identifies the service manager as having registered for network topology change notifications and specifies how to communicate with the service manager (e.g., includes an IP address). The notification can include the network topology, an indication of the network topology changes, etc. After the SDN interface notifies the service manager that the network topology has changed, the process ends.

In some instances, the SDN interface can determine that the network configuration change did or did not result in a network topology change without acquiring the sub-topologies. For example, the SDN interface might access a predetermined list of network configuration changes that do not cause network topology changes. Similarly, the SDN interface might be able to determine the changed network topology based on the indication of the network configuration change. For example, the indication of the network configuration change might indicate the specific change to the sub-topology and the SDN interface might determine that the change to the sub-topology does not affect other portions of the network topology. Thus, the SDN interface can update an existing representation of the network topology to reflect the indicated change without acquiring the sub-topologies.

The operations depicted in FIG. 7 assume that at least one service manager has registered for network topology change notifications. In some implementations, the SDN interface might determine whether a service manager has registered for network topology change notifications prior to acquiring the sub-topologies. Thus, if there is no component to notify of a network topology change, the SDN interface can avoid the operations involved in determining the network topology.

The operations described in relation to FIG. 7 illustrate an example in which the SDN interface acts as a filter for a service manager. In particular, while various aspects of the network configuration might change frequently, only a small number of these changes might result in a change to the network topology. Thus, the SDN interface can determine when actual network configuration changes result in network topology changes, effectively filtering out undesired notifications, reducing the bandwidth and other computing resources used by the service manager.

As used herein, the term "measurement" includes "metrics", "statistics", etc.

FIGS. 1, 3, and 4 are annotated with a series of letters (A through G, A through L, and A through F, respectively). These letters represent stages of operations. Although these stages are ordered for these examples, the stages illustrate three examples to aid in understanding this disclosure and should not be used to limit the claims. Subject matter falling within the scope of the claims can vary with respect to the order and some of the operations.

The flowcharts are provided to aid in understanding the illustrations and are not to be used to limit scope of the claims. The flowcharts depict example operations that can vary within the scope of the claims. Additional operations may be performed; fewer operations may be performed; the operations may be performed in parallel; and the operations may be performed in a different order. For example, a service manager can receive notifications from an SDN controller asynchronously. Thus, the operations depicted in blocks 202 through 214 can be performed in parallel or concurrently for different notifications. It will be understood that each block of the flowchart illustrations and/or block diagrams, and combinations of blocks in the flowchart illustrations and/or block diagrams, can be implemented by program code. The program code may be provided to a processor of a general purpose computer, special purpose computer, or other programmable machine or apparatus.

As will be appreciated, aspects of the disclosure may be embodied as a system, method or program code/instructions stored in one or more machine-readable media. Accordingly, aspects may take the form of hardware, software (including firmware, resident software, micro-code, etc.), or a combination of software and hardware aspects that may all generally be referred to herein as a "circuit," "module" or "system." The functionality presented as individual modules/units in the example illustrations can be organized differently in accordance with any one of platform (operating system and/or hardware), application ecosystem, interfaces, programmer preferences, programming language, administrator preferences, etc.

Any combination of one or more machine readable medium(s) may be utilized. The machine readable medium may be a machine readable signal medium or a machine readable storage medium. A machine readable storage medium may be, for example, but not limited to, a system, apparatus, or device, that employs any one of or combination of electronic, magnetic, optical, electromagnetic, infrared, or semiconductor technology to store program code. More specific examples (a non-exhaustive list) of the machine readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a machine readable storage medium may be any tangible medium that can contain, or store a program for use by or in connection with an instruction execution system, apparatus, or device. A machine readable storage medium is not a machine readable signal medium. A machine readable storage medium does not include transitory, propagating signals.

A machine readable signal medium may include a propagated data signal with machine readable program code embodied therein, for example, in baseband or as part of a carrier wave. Such a propagated signal may take any of a variety of forms, including, but not limited to, electromagnetic, optical, or any suitable combination thereof. A machine readable signal medium may be any machine readable medium that is not a machine readable storage medium and that can communicate, propagate, or transport a program for use by or in connection with an instruction execution system, apparatus, or device.

Program code embodied on a machine readable medium may be transmitted using any appropriate medium, including but not limited to wireless, wireline, optical fiber cable, RF, etc., or any suitable combination of the foregoing.

Computer program code for carrying out operations for aspects of the disclosure may be written in any combination of one or more programming languages, including an object oriented programming language such as the Java® programming language, C++ or the like; a dynamic programming language such as Python; a scripting language such as Perl programming language or PowerShell script language; and conventional procedural programming languages, such as the "C" programming language or similar programming languages. The program code may execute entirely on a stand-alone machine, may execute in a distributed manner across multiple machines, and may execute on one machine while providing results and or accepting input on another machine.

The program code/instructions may also be stored in a machine readable medium that can direct a machine to function in a particular manner, such that the instructions stored in the machine readable medium produce an article of manufacture including instructions which implement the function/act specified in the flowchart and/or block diagram block or blocks.

Figure 8:
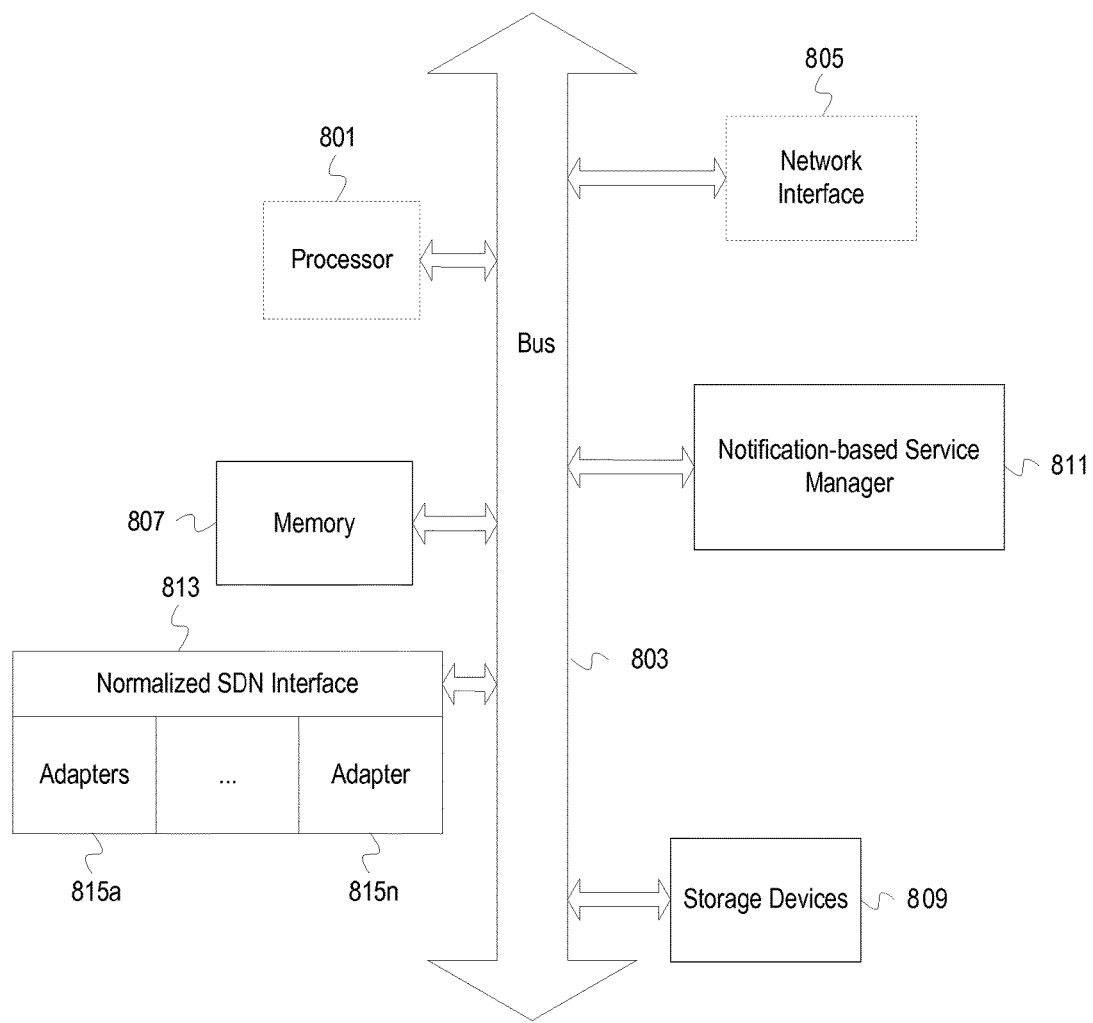
FIG. 8 depicts an example computer system with a service manager and a SDN interface.

FIG. 8 depicts an example computer system with a service manager and a SDN interface. The computer system includes a processor 801 (possibly including multiple processors, multiple cores, multiple nodes, and/or implementing multi-threading, etc.). The computer system includes memory 807. The memory 807 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The computer system also includes a bus 803 (e.g., PCI, ISA, PCI-Express, HyperTransport® bus, InfiniBand® bus, NuBus, etc.) and a network interface 805 (e.g., a Fiber Channel interface, an Ethernet interface, an internet small computer system interface, SONET interface, wireless interface, etc.). The computer system also includes a service manager 811. The service manager 811 implements functionality to register for and receive notifications from an SDN controller or other component. The service manager 811 also implements functionality to identify configuration-dependent network functionality and update the configuration-dependent network functionality based, at least in part, on changes to a network configuration. The computer system also includes an SDN interface 813. The SDN interface 813 implements functionality to receive registration requests from the service manager 811 and notify the service manager 811 in accordance with the registration requests. Additionally, the SDN interface 813 implements functionality to receive messages from the service manager 811 that conform to a normalized SDN protocol, identify destinations of the messages and associated adapters of adapters 815a through 815n, and pass the messages to the identified adapters. The adapters 815a through 815n implement functionality to transform messages conforming to the normalized SDN protocol to messages conforming to the various SDN protocols used by SDN managers (not depicted) that are communicatively coupled to the SDN interface 813 (possibly via the adapters 815a through 815n). The adapters 815a through 815n can also implement functionality to transform messages conforming to a plurality of SDN protocols used by SDN managers to messages conforming to the normalized SDN protocol. Any one of the previously described functionalities may be partially (or entirely) implemented in hardware and/or on the processor 801. For example, the functionality may be implemented with an application specific integrated circuit, in logic implemented in the processor 801, in a co-processor on a peripheral device or card, etc. Further, realizations may include fewer or additional components not illustrated in FIG. 8 (e.g., video cards, audio cards, additional network interfaces, peripheral devices, etc.). The processor 801 and the network interface 805 are coupled to the bus 803. Although illustrated as being coupled to the bus 803, the memory 807 may be coupled to the processor 801. Further, although the service manager 811 and the SDN interface 813 are illustrated as being part of the same computer system, the service manager 811 and the SDN interface 813 can be components of two different computer systems communicatively coupled via one or more networks.

While the aspects of the disclosure are described with reference to various implementations and exploitations, it will be understood that these aspects are illustrative and that the scope of the claims is not limited to them. In general, techniques for efficiently updating network configuration dependent functionality as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the disclosure. In general, structures and functionality presented as separate components in the example configurations may be implemented as a combined structure or component. Similarly, structures and functionality presented as a single component may be implemented as separate components. These and other variations, modifications, additions, and improvements may fall within the scope of the disclosure.

As used herein, the term "or" is inclusive unless otherwise explicitly noted. Thus, the phrase "at least one of A, B, or C"

is satisfied by any element from the set {A, B, C} or any combination thereof, including multiples of any element.

What is claimed is:

1. A method comprising:
   registering with a software-defined network controller for a service manager to receive notifications about a network that includes software-defined network components controlled by the software-defined network controller, wherein the service manager is an application that monitors the network based on a service-level agreement;
   based on receipt of a notification in accordance with the registering, determining a network configuration change indicated by the notification;
   determining a topology of at least the software-defined network components at a time proximate with receipt of the notification;
   determining that one or more network monitoring functionalities of the service manager are impacted by the network configuration change based, at least in part, on the topology; and
   based on determining that the one or more network monitoring functionalities are impacted, updating the one or more network monitoring functionalities based, at least in part, on the topology.

2. The method of claim 1, wherein said registering to receive the notifications comprises sending, from the service manager to a software-defined networking interface, a registration request, wherein the registration request identifies configuration change notifications.

3. The method of claim 1, wherein said determining that one or more network monitoring functionalities are impacted by the network configuration change comprises:
   identifying a first of the software-defined network components associated with the network configuration change; and
   identifying metadata that associates the first software-defined network component to the one or more network monitoring functionalities.

4. The method of claim 1, wherein the network configuration change comprises at least one of the provisioning of one or more of the software-defined network components, the removal of one or more of the software-defined network components, or the creation of a service chain.

5. The method of claim 1, wherein the software-defined network components are communicatively coupled to form a service chain, wherein said determining that the one or more network monitoring functionalities are impacted by the network configuration change comprises:
   determining that the network configuration change impacted the service chain; and
   identifying the service level agreement based on association with the service chain.

6. The method of claim 5, wherein said determining that one or more network monitoring functionalities are impacted by the network configuration change comprises identifying one or more tests associated with the service level agreement, wherein said updating the one or more network monitoring functionalities comprises updating the one or more tests based, at least in part, on the network configuration change.

7. The method of claim 5, wherein said updating the one or more network monitoring functionalities comprises deploying one or more tests associated with the service level agreement.

8. The method of claim 1, wherein the network configuration change comprises a modification to the service level agreement, wherein said determining that the one or more network monitoring functionalities are impacted by the network configuration change comprises identifying service chains associated with the service level agreement, wherein a first of the service chains comprises one or more of the software-defined networking components, wherein said updating the one or more network monitoring functionalities comprises:
   determining a test for monitoring compliance of the first service chain with the service level agreement; and
   deploying the test to those of the software-defined networking components associated with the first service chain.

9. The method of claim 1 further comprising:
   sending, to the software-defined network controller, a command to modify a service chain;
   wherein said determining that the notification indicates the network configuration change comprises determining, based, at least in part, on the notification, that the service chain has been modified.

10. One or more non-transitory machine-readable storage media comprising program code for a service manager to adapt network monitoring to network configuration changes in a network associated with a software-defined network controller, the program code to:
    register with the software-defined network controller for the service manager to receive notifications about a network that includes software-defined network components controlled by the software-defined network controller, wherein the service manager is an application that monitors the network based on a service-level agreement;
    based on receipt of a notification sent in accordance with said registration, determine a network configuration change indicated by the notification;
    request from the software-defined network controller current topology of the network to determine whether topology of the network has changed based on the network configuration change;
    based on a determination that the topology has changed, determine whether one or more network monitoring functionalities of the service manager are impacted by the topology change; and
    based on a determination that the one or more network monitoring functionalities are impacted, update the one or more network monitoring functionalities based, at least in part, on the topology change.

11. The non-transitory machine-readable storage media of claim 10, wherein the program code to register to receive the notifications comprises program code to send, to a software-defined networking interface, a registration request, wherein the registration request identifies configuration change notifications.

12. An apparatus comprising:
    a processor; and
    a machine-readable medium having program code for a service manager executable by the processor to cause the apparatus to,
       register with a software-defined network controller for the service manager to receive notifications about a network that includes software-defined network components controlled by the software-defined network controller, wherein the service manager is an application that monitors the network based on a service-level agreement;

based on detection of receipt of a notification sent in accordance with said registration, determine a network configuration change indicated by the notification;

responsive to receipt of the notification and based on the network configuration change, request from the software-defined network controller current topology of the network to determine whether topology of the network changed;

determine whether one or more network monitoring functionalities are impacted based, at least in part, on the topology change; and based on a determination that the one or more network monitoring functionalities are impacted, update the one or more network monitoring functionalities based, at least in part, on the topology change.

13. The apparatus of claim 12, wherein the program code executable by the processor to cause the apparatus to register to receive the notifications comprises program code executable by the processor to cause the apparatus to send, to a software-defined networking interface, a registration request, wherein the registration request identifies configuration change notifications.

14. The apparatus of claim 12, wherein the program code executable by the processor to cause the apparatus to determine whether one or more network monitoring functionalities are impacted comprises program code executable by the processor to cause the apparatus to:

identify a first of the software-defined network components associated with the network configuration change; and identify metadata that associates the first software-defined network component to the one or more network monitoring functionalities.

15. The apparatus of claim 12, wherein the network configuration change comprises at least one of the provisioning of one or more of the software-defined network components, the removal of one or more of the software-defined network components, or the creation of a service chain.

16. The apparatus of claim 12, wherein the software-defined network components are communicatively coupled to form a service chain, wherein the program code executable by the processor to cause the apparatus to determine whether one or more network monitoring functionalities are impacted by the topology change comprises program code executable by the processor to cause the apparatus to:

determine whether the network configuration change impacted the service chain; and identify a service level agreement associated with the service chain.

17. The apparatus of claim 16, wherein the program code executable by the processor to cause the apparatus to determine whether one or more network monitoring functionalities are impacted comprises program code executable by the processor to cause the apparatus to identify one or more tests associated with the service level agreement, wherein the program code executable by the processor to cause the apparatus to update the one or more network monitoring functionalities comprises program code executable by the processor to cause the apparatus to update the one or more tests based, at least in part, on the topology change.

18. The apparatus of claim 16, wherein the program code executable by the processor to cause the apparatus to update the one or more network monitoring functionalities comprises program code executable by the processor to cause the apparatus to deploy one or more tests associated with the service level agreement.

19. The apparatus of claim 12, wherein the program code further comprises program code executable by the processor to cause the apparatus to:

send, to a software-defined network controller, a command to provision one of the software-defined network component prior to receipt of the notification;

determine that the one of the software-defined network components has been provisioned based, at least in part, on the notification; and based on a determination that the one of the software-defined network components has been provisioned, determine a startup latency associated with the software-defined network component.

20. The apparatus of claim 12, wherein the program code further comprises program code executable by the processor to cause the apparatus to:

send, to a software-defined network controller, a command to release one of the software-defined network components prior to receipt of the notification;

determine that the one of the software-defined network components has been released based, at least in part, on the notification; and based on a determination that the one of the software-defined network components has been released, determine a shutdown latency associated with the one of the software-defined network components.

* * * * *